United States Patent [19]

Heine et al.

[11] 4,427,707

[45] Jan. 24, 1984

[54] METHOD FOR THE PRODUCTION OF FOOD ADDITIVES WITH IMPROVED TASTE

[75] Inventors: Christian Heine, Monheim; Reinhold Wüst, Kaarst, both of Fed. Rep. of Germany

[73] Assignee: Henkel KGaA, Fed. Rep. of Germany

[21] Appl. No.: 361,781

[22] Filed: Mar. 25, 1982

[30] Foreign Application Priority Data

Apr. 11, 1981 [DE] Fed. Rep. of Germany ....... 3114783

[51] Int. Cl.³ .......................... A23L 1/20; A23G 1/00
[52] U.S. Cl. ..................................... 426/312; 426/573; 426/425; 426/430; 426/486; 426/488; 426/629
[58] Field of Search ............... 426/573, 312, 425, 430, 426/486, 488, 615, 629, 472, 467, 468, 469

[56] References Cited

U.S. PATENT DOCUMENTS

| | | | |
|---|---|---|---|
| 479,512 | 7/1892 | Jacobs | 426/469 |
| 3,939,281 | 2/1976 | Schwengers | 426/429 |
| 4,123,559 | 10/1978 | Vitzthum et al. | 426/312 |
| 4,168,324 | 9/1979 | Roselius | 426/312 |
| 4,198,432 | 4/1980 | Vitzthum et al. | 426/312 |
| 4,200,656 | 4/1980 | Cohen et al. | 426/312 |
| 4,328,255 | 5/1982 | Roselius et al. | 426/425 |

Primary Examiner—Jeanette M. Hunter
Attorney, Agent, or Firm—Hammond, Littell, Weissenberger and Muserlian

[57] ABSTRACT

Locust Bean Pod Powder, Locust Bean Gum Powder and Guar Gum Powder originally having odor and taste characteristics making them unsuitable as food additives, can be made suitable therefor by extraction with gases at supercritical temperatures.

2 Claims, No Drawings

METHOD FOR THE PRODUCTION OF FOOD ADDITIVES WITH IMPROVED TASTE

BACKGROUND OF THE INVENTION

The ripened fruits of the locust bean tree (*ceretonic siliqua*) consist of brown pods of 10 to 20 cm in length with 5 to 10 beans each. From the beans, locust gum powder is obtained as a swelling substance, while the empty pods yield a product which is suitable, particularly because of its color, for extending or as a substitute for cocoa powder.

For this latter purpose the pods are first split, and the outer skin is removed. Then they are roasted to remove, as far as possible, the water contained therein and subsequently cooled to room temperature, ground and sifted. The powder obtained has about the following composition:

| | |
|---|---|
| Water | 2.0–12.0% |
| Fat | 0.5–1.5% |
| Raw Protein | 4.0–5.0% |
| Raw Fiber | 4.0–5.0% |
| Ashes | 2.0–4.0% |
| Nitrogen-free Extract | 80.0–85.0% |
| The total sugar content is 30–52%. | |

Unfortunately sometimes locust bean pod powder has an unpleasant odor and tastes like burnt fat, so that it can not be readily used in the production of high-quality products in the food sector, particularly as a substitute for cocoa powder.

The locust bean gum powder used as a swelling substance often also has an unpleasant odor and after-taste. Similar sensory problems also exist in other gums used as swelling substances, such as guar gum powder which is obtained from the seeds of the guar pod (cyamopsis tetragonolba) and has a similar composition, al,4-B-glycoside-linked D-mannopyranose-units with D-galactopyranose side radicals, as locust bean gum powder. Both products are also of interest as food additives, e.g. for the production of ice cream, fish products, beverages, sauces, puddings, potato products, bread, etc.

OBJECTS OF THE INVENTION

An object of the present invention is to provide a method for the production of food additives having an improved taste.

Another object of the present invention is to provide a method for the production of locust bean pod powder, locust bean gum powder and guar gum powder having improved taste which does not alter appreciably their other characteristics.

A further object of the present invention is to provide food additives having improved odor and taste characteristics.

A further object of the present invention is to provide locust bean pod powder, locust bean gum powder and guar gum powder having improved odor and taste characteristics which comprises subjecting said materials to extraction with gases at elevated pressures and at a temperature which is supercritical to the gas chosen.

These and other objects of the present invention will become more apparent as the description thereof proceeds.

DESCRIPTION OF THE INVENTION

The present invention relates to the problem which occurs when for some reason the powders obtained from locust bean pods, locust beans, and guar seeds are found to have an unacceptable unpleasant taste and odor. A large batch would have to be wasted, before the present invention, to protect the integrity of the foods to which these materials are added. This problem may be remedied and the various powders purged of the source of taste and odor by subjecting them to extraction with gases at supercritical temperatures.

The subject of the invention therefor is a method for the production of locust bean pod-, locust bean gum or guar gum powder having improved taste, characterized in that the dried, if necessary, roasted and ground starting materials are subjected to high pressure extraction with supercritical $CO_2$.

The extraction of natural products with $CO_2$ at supercritical temperatures has recently gained increasing importance, since it is particularly suitable for the gentle production of aromatic substances, etc. In the present case, however, the method serves to remove substances giving rise to undesired flavors and odors without substantially affecting the appearance and properties of the starting materials.

The techniques of extraction of natural products using gases, particularly $CO_2$ at supercritical temperatures is well known. Occasionally variations in the batches of materials may require slight adjustments in operating conditions to obtain optimum results but the general teaching for successful extraction of natural materials using gases at supercritical temperatures is contained in a series of articles published in Angewandte Chemie, 90, 747-744 (1978) and which are hereby incorporated as part of the disclosure of the present application.

The use of $CO_2$ as the gas for extraction at supercritical temperatures is particularly suitable in the preparation of food or food additives since it is easily removed and presents no health or environmental hazard.

A particular and unanticipated benefit derived from the present invention is the obtaining from locust bean pods of a product which is particularly suitable in powder form as an extender for natural cocoa powder or as a complete substitute therefor.

The following examples are provided by way of illustration and not limitation. They are not to be construed as limiting the invention thereto.

A laboratory high-pressure extraction unit capable of producing the conditions required for extraction of powdered, natural materials was employed.

EXAMPLE I 500 g of dried, roasted locust bean pod powder which resembles cocoa powder in color and which had been found to have an unsatisfactory odor and taste were placed into the extraction tank of the laboratory high-pressure extraction unit. The unit was charged with $CO_2$ from a storage tank over diaphragm compressors into the extraction tank at a pressure of 350 bar and at a temperature of 45° C. The pressured extraction tank was regulated so that as each expansion of gas and extracted material went to the separating tank any depletion was automatically made up by addition of $CO_2$ at supercritical temperatures. The extraction is accomplished by expanding the gas into the separating tank at a pressure of 40 bar and at a temperature of 20° C.

The extraction continued for 5 hours. The extracted product was unchanged in color and had a mild pleasant odor and an agreeable taste.

EXAMPLE II

A run was made using 500 g of locust bean gum powder which had unsatisfactory odor and taste characteristics. The operating conditions of pressure and temperature were the same. The gas was $CO_2$ and the extraction lasted 5 hours. The extracted locust bean gum powder was unchanged in color and had a mild, pleasant odor and agreeable taste.

EXAMPLE III

A run was made using 500 g of guar gum powder which had unsatisfactory odor and taste characteristics. The operating conditions were again a $CO_2$ pressure in the extraction of about 350 bar at a temperature of about 45° C. The expansion into the separating tank took place at a pressure of 40 bar and a temperature of 20° C. The extraction used $CO_2$ and lasted 5 hours. The extracted guar gum powder was unchanged in color and had a mild, pleasant odor and an agreeable taste.

The preceding specific embodiments are illustrative of the practice of the present invention. It is to be understood, however, that variations which may be obvious to those skilled in the art or suggested herein, may be employed without departing from the spirit of the invention or the scope of the appended claims.

We claim:

1. A method of improving the taste and odor characteristics of a powder selected from the group consisting of locust bean pods, locust bean gum and guar gum comprising drying, and powdering and roasting a member of the group consisting of locust bean pods, locust bean gum and guar gum and extracting the powder at elevated pressures with liquid carbon dioxide at its supercritical temperatures.

2. Locust bean pod powder, locust bean gum powder and guar gum powder having improved odor and taste characteristics produced according to the method of claim 1.

* * * * *